US010710837B2

(12) United States Patent
Tetsuka

(10) Patent No.: US 10,710,837 B2
(45) Date of Patent: Jul. 14, 2020

(54) GUIDE APPARATUS FOR LONG OBJECT

(71) Applicant: TSUBAKIMOTO CHAIN CO., Osaka-shi, Osaka (JP)

(72) Inventor: Takayuki Tetsuka, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 25 days.

(21) Appl. No.: 16/318,207

(22) PCT Filed: Jul. 28, 2017

(86) PCT No.: PCT/JP2017/027535
§ 371 (c)(1),
(2) Date: Jan. 16, 2019

(87) PCT Pub. No.: WO2018/030188
PCT Pub. Date: Feb. 15, 2018

(65) Prior Publication Data
US 2019/0284013 A1 Sep. 19, 2019

(30) Foreign Application Priority Data

Aug. 8, 2016 (JP) .................................. 2016-155774

(51) Int. Cl.
*B65H 51/20* (2006.01)
*B65H 57/00* (2006.01)
*H02G 11/00* (2006.01)

(52) U.S. Cl.
CPC .............. *B65H 51/20* (2013.01); *B65H 57/00* (2013.01); *H02G 11/00* (2013.01); *B65H 2701/33* (2013.01); *B65H 2701/34* (2013.01)

(58) Field of Classification Search
CPC ........ B65H 57/00; B65H 57/28; B65H 51/20; B65H 2701/33; B65H 2701/34; H02G 11/00; H02G 11/006
See application file for complete search history.

(56) References Cited

U.S. PATENT DOCUMENTS

2002/0092662 A1 7/2002 Grant et al.
2006/0030174 A1 2/2006 Tsubaki et al.

FOREIGN PATENT DOCUMENTS

JP 50-27396 U 3/1975
JP 2006-74980 A 3/2006
JP 2015-117759 A 6/2015

OTHER PUBLICATIONS

International Search Report dated Sep. 5, 2017, issued in counterpart International Application No. PCT/JP2017/027535 (1 pages).

*Primary Examiner* — William E Dondero
(74) *Attorney, Agent, or Firm* — Westerman, Hattori, Daniels & Adrian, LLP

(57) ABSTRACT

The guide apparatus for a long object comprises: a movable portion that is capable of reciprocal movement in a reciprocal direction; a fixed portion; a pair of sheets that have flexibility; and a guide member. The fixed portion is fixed so that the movement in the reciprocal direction is not possible. The pair of sheets, with a curved part formed at an intermediate position in the longitudinal direction, couple the movable portion and the fixed portion. The guide member reciprocates in the reciprocal direction while guiding the movable portion and the pair of sheets so that the pair of sheets reciprocate in the reciprocal direction as the curved part is shifted in accordance with the reciprocal movement of the movable portion. The guide member forms, together with the pair of sheets, a storage chamber for storing a long object.

5 Claims, 6 Drawing Sheets

GUIDE APPARATUS FOR LONG OBJECT

BACKGROUND OF THE INVENTION

The present invention relates to a guide device for a long object such as a flexible cable or hose that supplies electricity or liquid to a moving body included in a machine tool. With the long object accommodated, the guide device protects and guides the long object in accordance with movement of the moving body.

For example, patent document 1 discloses this type of long object guide device known in the prior art. The long object guide device disclosed in patent document 1 includes links pivotally coupled in line. An accommodation space extends in the guide device in the linear direction. When the long object guide device is used, one end of the long object guide device is coupled to the moving body that reciprocates in the linear direction, and the other end is fixed to a fixing portion.

The long object guide device protects and guides the long object, which is accommodated in the accommodation space, in accordance with reciprocal movement of the moving body. In this case, the long object guide device is arranged so that an intermediate portion of the long object guide device includes a curved part. The curved part moves in the linear direction in accordance with the reciprocal movement of the moving body.

PRIOR ART DOCUMENT

Patent Document

Patent Document 1: Japanese Laid-Open Patent Publication No. 2015-117759

SUMMARY OF THE INVENTION

Since the long object guide device described above includes the links pivotally coupled in line, adjacent ones of the links pivot and rub against each other when the long object guide device is used. Thus, the links easily wear. The long object guide device has a linear part arranged closer to the moving body than the curved part. When the links wear and the linear part sags due to its weight, a period in which the long object guide device is able to be used ends. More specifically, a wear state of the links determines the life of the long object guide device. Thus, the life is relatively short.

It is an object of the present invention to provide a guide device for a long object that has a prolonged life.

The means for achieving the above object and the operation and advantages will now be described.

To achieve the above object, a guide device for a long object includes a movable portion reciprocally movable in a reciprocal direction, a fixed portion fixed to be immovable in the reciprocal direction, a flexible connecting portion connecting the movable portion and the fixed portion when the connecting portion includes a curved part at an intermediate position in a longitudinal direction, and a guide member defining an accommodation chamber together with the connecting portion. The accommodation chamber is capable of accommodating the long object. The guide member reciprocates in the reciprocal direction while guiding the movable portion and the connecting portion so that the connecting portion reciprocates in the reciprocal direction as the curved part is shifted in accordance with reciprocal movement of the movable portion.

In this configuration, the movable portion and the connecting portion are supported by the guide member. Thus, even when the connecting portion wears, a linear part of the connecting portion located closer to the movable portion than the curved part subtly sags. In other words, the wear of the connecting portion is not directly linked with the life of the device. Thus, the life of the device is prolonged as compared to a typical long object guide device having links such as that described in patent document 1.

Preferably, in the long object guide device described above, the connecting portion includes two sheets opposed to each other, and the accommodation chamber is defined between the two sheets.

In this configuration, while the connecting portion defines the accommodation chamber, the movable portion and the fixed portion are connected in a well-balanced manner.

Preferably, in the long object guide device described above, the movable portion includes a first rotary body capable of rotating, the fixed portion includes a second rotary body capable of rotating, the guide member includes a first contact surface and a second contact surface, when the movable portion and the guide portion reciprocate in the reciprocal direction, the first rotary body rotates in contact with the first contact surface, and when the movable portion and the guide portion reciprocate in the reciprocal direction, the second rotary body rotates in contact with the second contact surface.

In this configuration, the movable portion and the guide member smoothly reciprocate in the reciprocal direction.

Preferably, in the long object guide device described above, the fixed portion and the movable portion each include a long object fastener capable of fastening the long object accommodated in the accommodation chamber.

In this configuration, when the long object is fastened to the long object fastener, the long object is stably accommodated in the accommodation chamber.

Preferably, in the long object guide device described above, the guide member includes a rotary member that rotates in contact with a movement surface, along which the guide member reciprocates, when the guide member reciprocates in the reciprocal direction.

In this configuration, the guide member smoothly reciprocates in the reciprocal direction.

The present invention prolongs the life of the guide device for a long object.

DETAILED DESCRIPTION OF THE PREFERRED EMBODIMENTS

An embodiment of a guide device for a long object will now be described with reference to the drawings. In the description hereafter, the right side in FIGS. 1 and 2 refers to the front side of the long object guide device.

Figure 1:
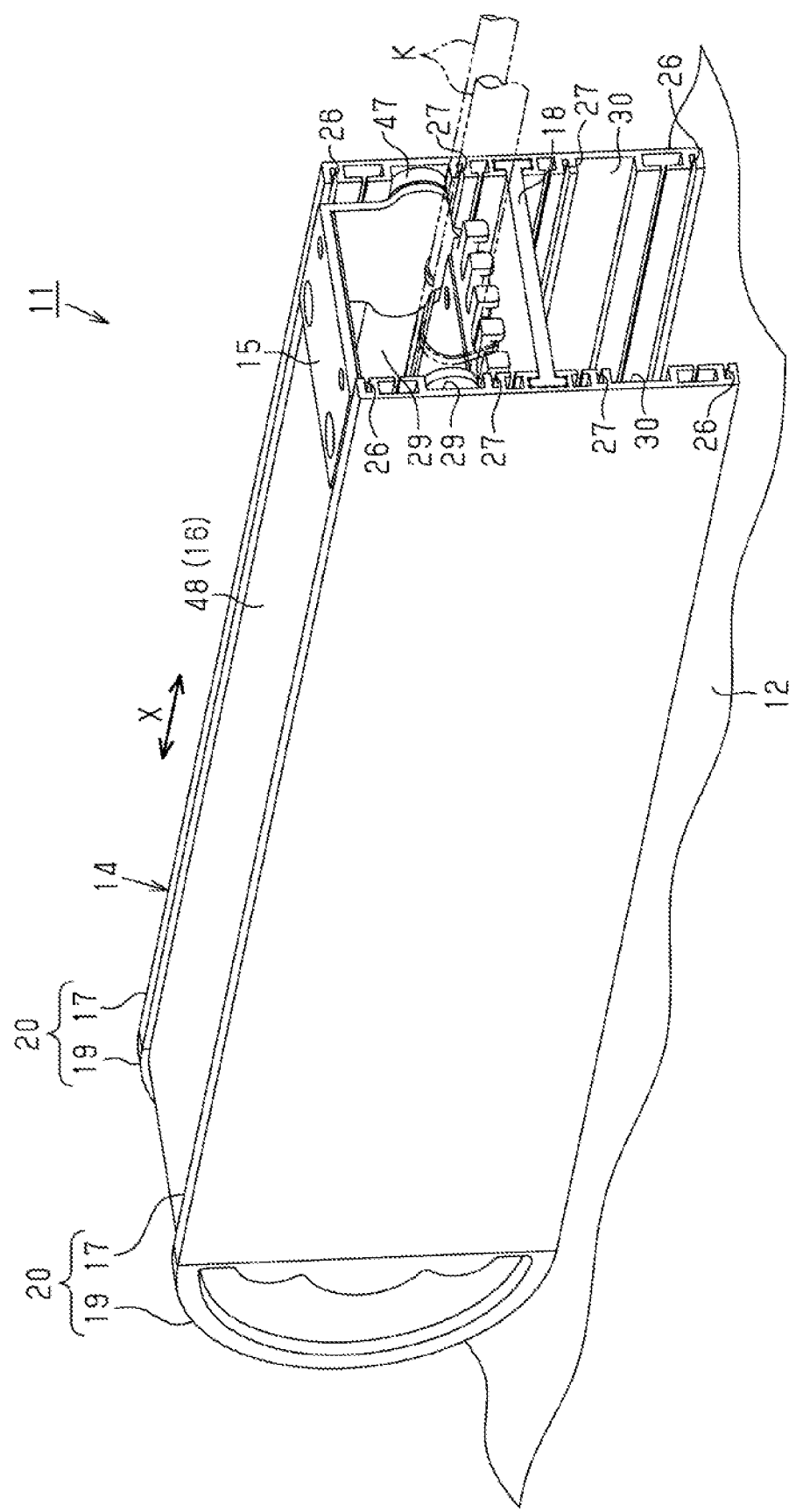
FIG. 1 is a perspective view showing an embodiment of a guide device for a long object.
Figure 2:
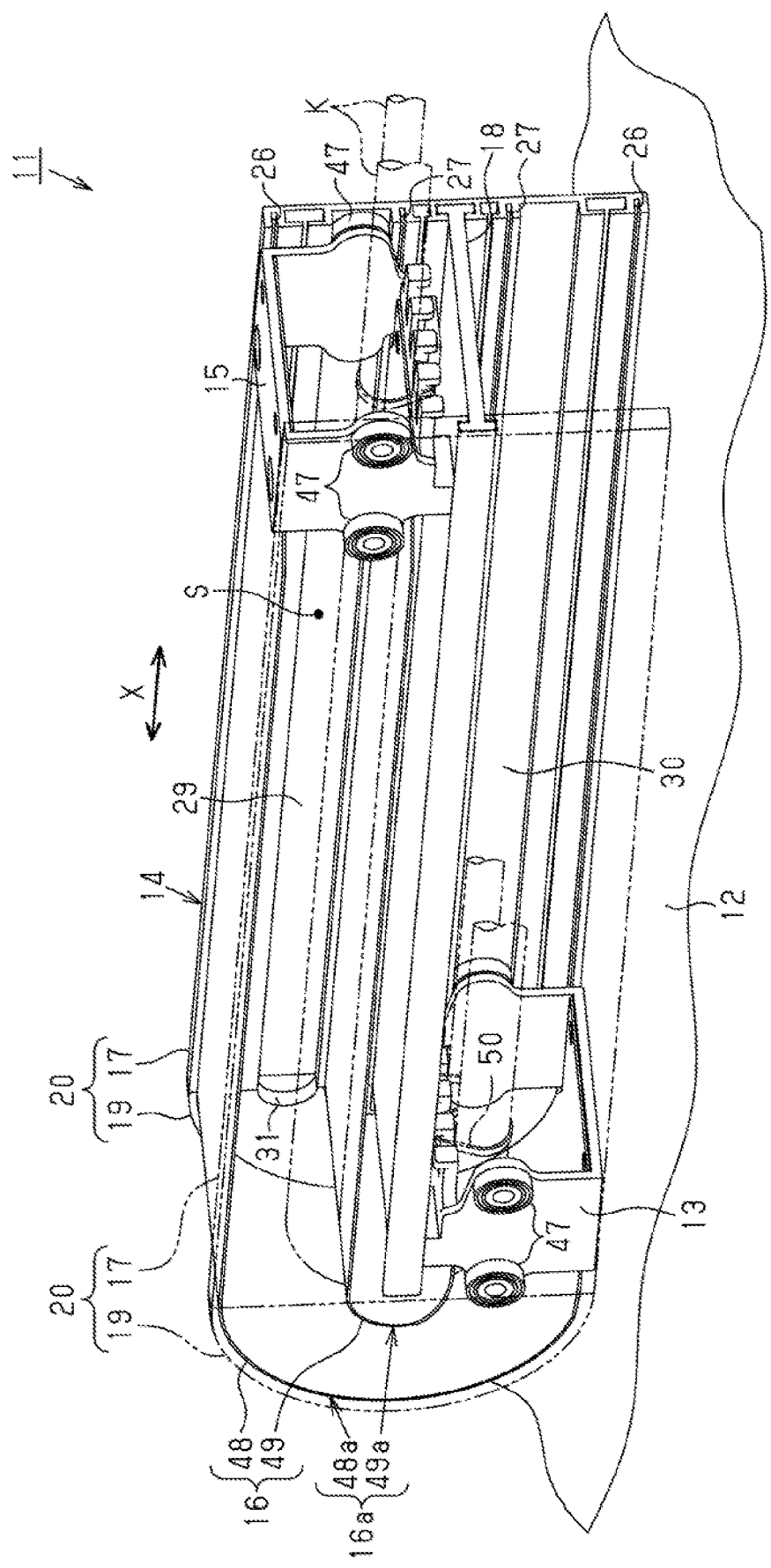
FIG. 2 is a perspective view showing the long object guide device arranged in a foremost position.

As shown in FIGS. 1 and 2, a long object guide device 11 has an overall rectangular box-shape. The long object guide device 11 is mounted on a mount surface 12, or a level surface, of equipment (not shown) that uses the long object guide device 11.

The long object guide device 11 includes a fixed portion 13, a guide member 14, and a movable portion 15. The fixed portion 13 is fixed to the mount surface 12 so that the fixed portion 13 is immovable in a reciprocal direction X corresponding to a longitudinal direction (front-rear direction) of the long object guide device 11. The guide member 14 is supported by the fixed portion 13 and reciprocally movable in the reciprocal direction X. The movable portion 15 is supported by the guide member 14 and reciprocally movable in the reciprocal direction X. The movable portion 15 is connected to, for example, a moving body (not shown) that is included in the equipment (not shown) and reciprocates in the reciprocal direction X.

The long object guide device 11 further includes two strips of sheets 16 corresponding to connecting portions. The two sheets 16 are flexible and connect the movable portion 15 and the fixed portion 13 when the two sheets 16 each have a semicircular curved part 16a at an intermediate position in the longitudinal direction. The two sheets 16 are opposed to each other. Preferably, the two sheets 16 are formed from, for example, a synthetic resin or a metal.

The guide member 14 includes two rectangular primary lateral plates 17 opposed to each other at the left and right sides, a rectangular coupling plate 18 coupling the primary lateral plates 17 to each other at a vertically central position, and two semicircular secondary lateral plates 19 coupled to the left and right primary lateral plates 17 and opposed to each other at the left and right sides. In this case, with the secondary lateral plates 19 coupled, the primary lateral plates 17 are configured to be guide lateral plates 20. More specifically, the primary lateral plates 17 and the secondary lateral plates 19 form the guide lateral plates 20.

Figure 3:
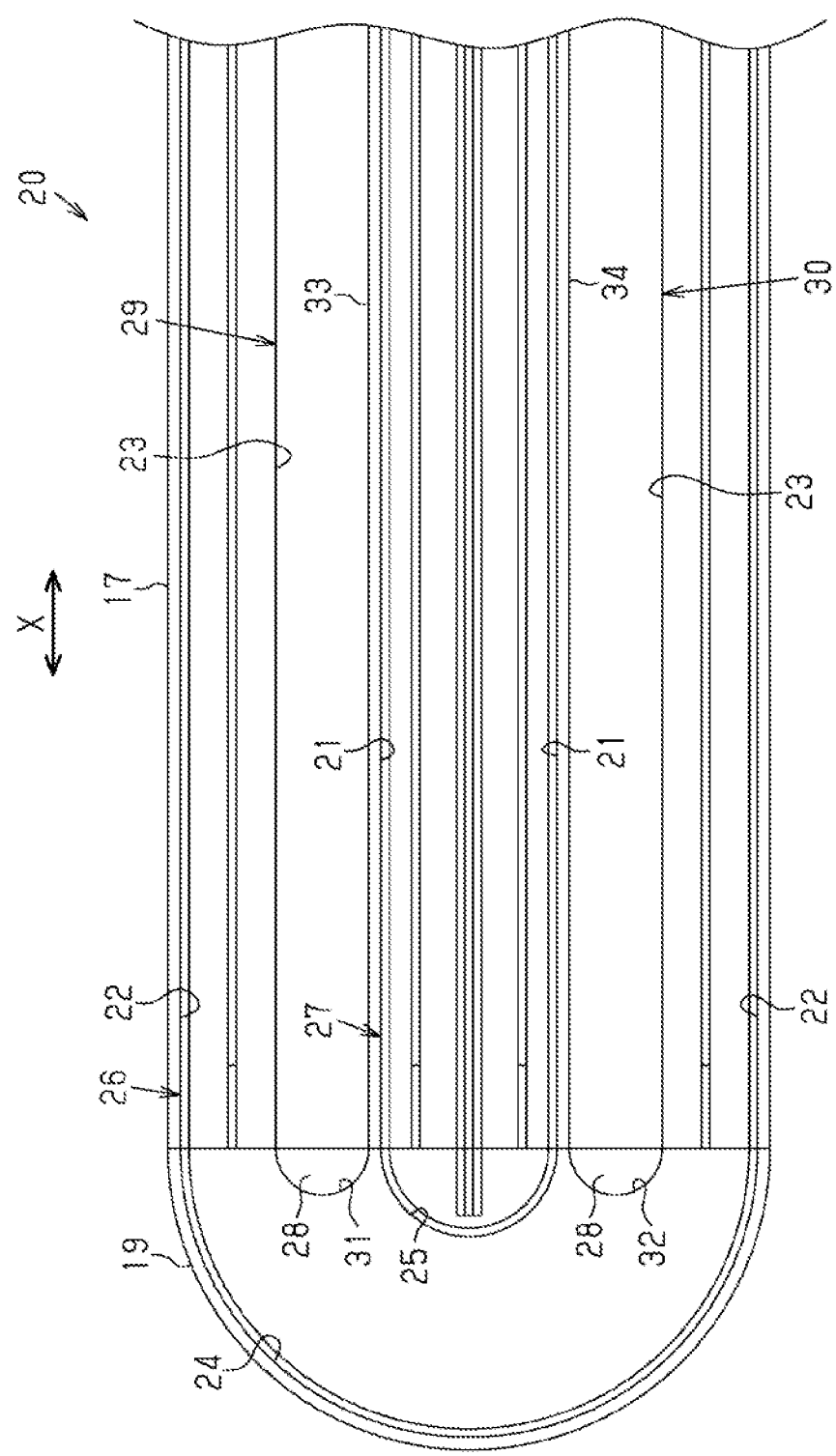
FIG. 3 is an enlarged side view showing a portion of a guide lateral plate.

As shown in FIG. 3, two inner linear grooves 21 extend straight in a vertically central portion of the inner surface of each primary lateral plate 17 in the reciprocal direction X along the full length of the primary lateral plate 17 and are arranged one above the other in the vertical direction. Two outer linear grooves 22 extend straight in vertically opposite ends of the inner surface of each primary lateral plate 17 in the reciprocal direction X along the full length of the primary lateral plate 17 and are arranged one above the other in the vertical direction.

Between the upper one of the inner linear grooves 21 and the upper one of the outer linear grooves 22 and between the lower one of the inner linear grooves 21 and the lower one of the outer linear grooves 22, two intermediate linear grooves 23 extend straight in the inner surface of each primary lateral plate 17 in the reciprocal direction X along the full length of the primary lateral plate 17 and are arranged one above the other in the vertical direction. The inner linear grooves 21 and the outer linear grooves 22 have the same width. The intermediate linear grooves 23 have a much greater width than the inner linear grooves 21 and the outer linear grooves 22.

A semicircular outer arcuate groove 24 extends in a semicircular edge of the inner surface of each secondary lateral plate 19 along the full length of the semicircular edge. A semicircular inner arcuate groove 25, having a much smaller radius than the outer arcuate groove 24, extends in a front end (end closer to primary lateral plate 17) of a vertically central portion of the inner surface of each secondary lateral plate 19. The widths of the outer arcuate groove 24 and the inner arcuate groove 25 are respectively set to be the same as the widths of the inner linear groove 21 and the outer linear groove 22. That is, the outer arcuate groove 24, the inner arcuate groove 25, the inner linear groove 21, and the outer linear groove 22 all have the same width.

The outer arcuate groove 24 connects the rear ends of the vertically-paired outer linear grooves 22. The inner arcuate groove 25 connects the rear ends of the vertically-paired inner linear grooves 21. In the present embodiment, each guide lateral plate 20 includes a U-shaped outer guide groove 26 formed by the outer arcuate groove 24 and the vertically-paired outer linear grooves 22. The guide lateral plate 20 also includes a U-shaped inner guide groove 27 formed by the inner arcuate groove 25 and the vertically-paired inner linear grooves 21.

The front end (end closer to primary lateral plate 17) of the inner surface of each secondary lateral plate 19 includes two semicircular recesses 28 respectively corresponding to the two intermediate linear grooves 23 in the reciprocal direction X. The diameter of each recess 28 is set to be the same size as the width of the intermediate linear groove 23. The depth of the recess 28 is set to be the same size as the depth of the intermediate linear groove 23. The two recesses 28 are respectively connected to the rear ends of the two intermediate linear grooves 23.

In the present embodiment, each guide lateral plate 20 includes an upper guide groove 29 formed by the upper one of the recesses 28 and the upper one of the intermediate linear grooves 23 and extending straight. The guide lateral plate 20 also includes a lower guide groove 30 formed by the lower one of the recesses 28 and the lower one of the intermediate linear grooves 23 and extending straight. More specifically, the inner surface of each guide lateral plate 20 includes the outer guide groove 26, the inner guide groove 27, the upper guide groove 29, and the lower guide groove 30.

In each secondary lateral plate 19, the upper one of the recesses 28 has an arcuate wall surface, that is, a rear wall surface of the upper guide groove 29, defining an upper contact surface 31. Additionally, in the secondary lateral plate 19, the lower one of the recesses 28 has an arcuate wall surface, that is, a rear wall surface of the lower guide groove 30, defining a lower contact surface 32. Additionally, the upper guide groove 29 has a lower wall surface defining a first contact surface 33. The lower guide groove 30 has an upper wall surface defining a second contact surface 34.

Figure 4:
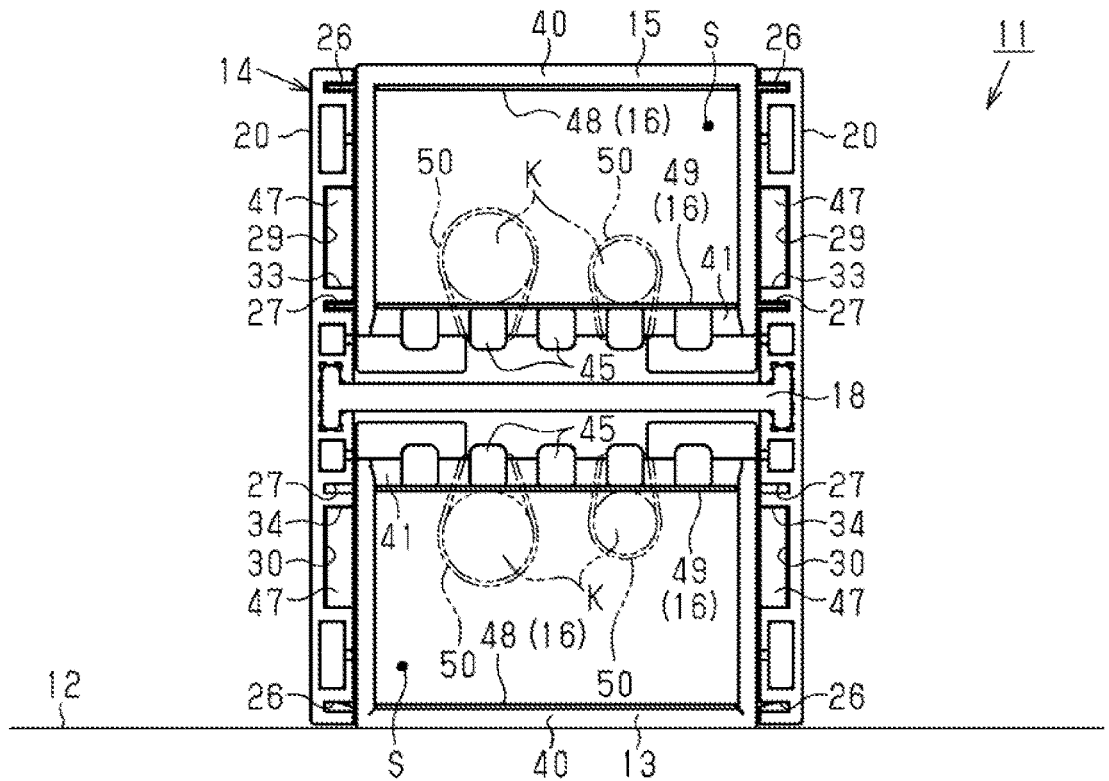
FIG. 4 is a front view of the long object guide device shown in FIG. 1.

As shown in FIGS. 2 and 4, in the long object guide device 11, the movable portion 15 has the form of a rectangular frame and is arranged at an upper side of the coupling plate 18 between the guide lateral plates 20. In the long object guide device 11, the fixed portion 13 has the form of a rectangular frame and is arranged at a lower side of the coupling plate 18 between the guide lateral plates 20. The movable portion 15 and the fixed portion 13 have the same structure and are arranged at vertically inverted positions. In this case, each of the movable portion 15 and the fixed portion 13 is arranged to be open at opposite sides in the reciprocal direction X.

Figure 5:
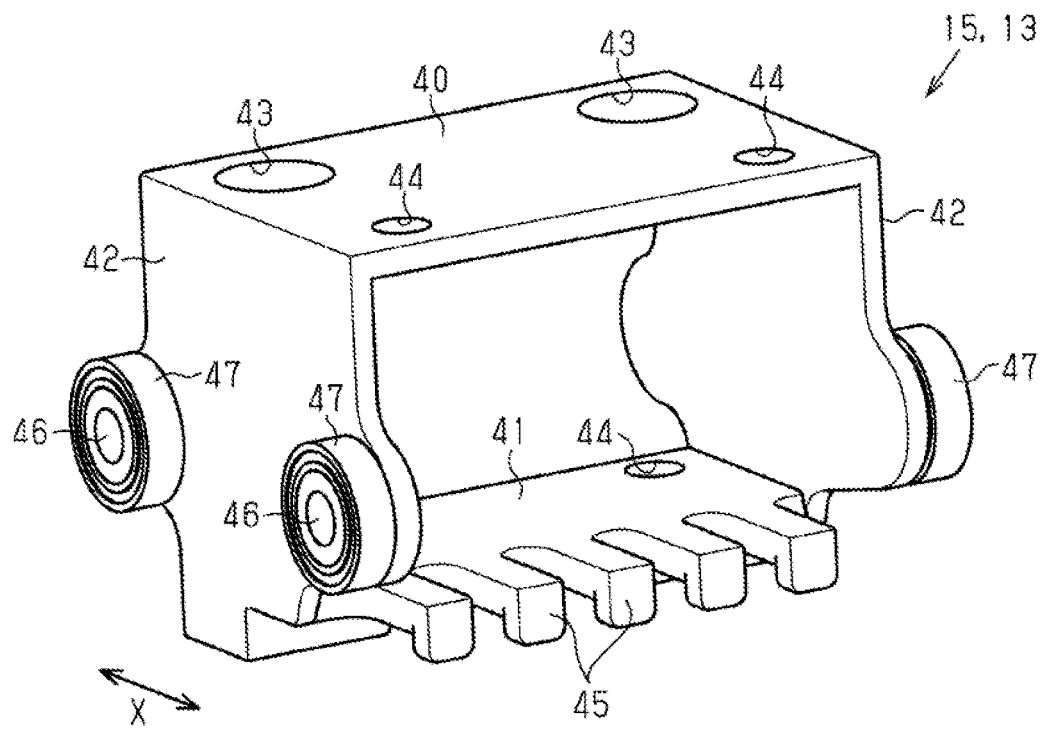
FIG. 5 is a perspective view of a fixed portion and a movable portion.

As shown in FIGS. 4 and 5, the movable portion 15 (fixed portion 13) is symmetrical at the left and right sides. The movable portion 15 (fixed portion 13) includes a coupling portion 40 having the form of a rectangular plate, a support portion 41 generally having the form of a rectangular plate and opposed to the coupling portion 40, and two lateral joints 42 generally having the form of a rectangular plate and connecting the coupling portion 40 and the support portion 41. Two coupling holes 43 extend through a rear end of the coupling portion 40 at the left and right sides so that the coupling portion 40 is coupled to the moving body (not shown) or the mount surface 12 with screws (not shown) or the like.

Two sheet coupling holes 44 extend through a front end of the coupling portion 40 at the left and right sides so that an end of the sheets 16 is coupled to the coupling portion 40 with screws (not shown) or the like.

Additionally, two sheet coupling holes 44 extend through a rear end of the support portion 41 at the left and right sides so that an end of the sheets 16 is coupled to the support portion 41 with screws (not shown) or the like. Projections 45, which act as long object fasteners, project frontward from a front end of the support portion 41 and are arranged at equal intervals in the sideward direction. In the present embodiment, five projections 45 are provided. Each projection 45 has a distal end that is orthogonally bent away from the coupling portion 40.

Two shafts 46 project from the outer surface of each lateral joint 42 and are arranged next to each other in the reciprocal direction X, which corresponds to the front-rear direction. Each shaft 46 rotationally supports a roller 47, which corresponds to a first rotary body (second rotary body). More specifically, the shaft 46 rotationally supports the roller 47 about an axis extending in the sideward direction corresponding to a direction in which the two lateral joints 42 are opposed to each other. The outer diameter of the roller 47 is set to be slightly smaller than the width of each of the upper guide groove 29 and the lower guide groove 30.

The fixed portion 13 and the movable portion 15 have the same structure. Thus, the rollers 47 of the movable portion 15 configured to be first rotary bodies are configured to be second rotary bodies when the movable portion 15 is inverted and used as the fixed portion 13. More specifically, the movable portion 15 and the fixed portion 13 each include two pairs of the rotatable rollers 47.

As shown in FIGS. 2 and 4, the two right rollers 47 of the movable portion 15 are rotationally inserted into the upper guide groove 29 in the right guide lateral plate 20 of the guide member 14. The two left rollers 47 of the movable portion 15 are rotationally inserted into the upper guide groove 29 in the left guide lateral plate 20 of the guide member 14. In this case, each roller 47 of the movable portion 15 is in contact with the first contact surface 33. The movable portion 15 is supported by the rollers 47 on the first contact surfaces 33.

The right two rollers 47 of the fixed portion 13 are rotationally inserted into the lower guide groove 30 in the right guide lateral plate 20 of the guide member 14. The left two rollers 47 of the fixed portion 13 are rotationally inserted into the lower guide groove 30 of the left guide lateral plate 20 of the guide member 14. In this case, each roller 47 of the fixed portion 13 is in contact with the second contact surface 34. The guide member 14 is supported by the second contact surface 34 on the fixed portion 13.

The outer one of the two sheets 16 is configured to be an outer sheet 48. The outer sheet 48 has one end coupled to the inner surface of the coupling portion 40 of the movable portion 15 and the other end coupled to the inner surface of the coupling portion 40 of the fixed portion 13. The widthwise direction of the outer sheet 48 is orthogonal to the reciprocal direction X and corresponds to the sideward direction. Opposite ends of the outer sheet 48 in the sideward direction are slidably inserted into the outer guide grooves 26 in the two guide lateral plates 20 of the guide member 14.

The inner one of the two sheets 16 is configured to be an inner sheet 49. The inner sheet 49 has one end coupled to the inner surface of the support portion 41 of the movable portion 15 and the other end coupled to the inner surface of the support portion 41 of the fixed portion 13. The widthwise direction of the inner sheet 49 is orthogonal to the reciprocal direction X and corresponds to the sideward direction. Opposite ends of the inner sheet 49 are slidably inserted into the inner guide grooves 27 in the two guide lateral plates 20 of the guide member 14.

The two guide lateral plates 20 of the guide member 14 and the two sheets 16 (outer sheet 48 and inner sheet 49) surround space defining an accommodation chamber S capable of accommodating a long object K. More specifically, the two guide lateral plates 20 of the guide member 14 define the accommodation chamber S together with the two sheets 16. More specifically, the accommodation chamber S is defined between the two sheets 16, namely, the outer sheet 48 and the inner sheet 49.

The long object K includes, for example, an electric cable or an optical fiber cable supplying electricity or transmitting a signal to the moving body (not shown) connected to the movable portion 15, a hose supplying a gas (e.g., air) or a liquid (e.g., water, oil) to the moving body (not shown), and a long multi-joint member that is flexibly bendable.

One end of the long object K, which is accommodated in the accommodation chamber S, is fastened to the projections 45 of the support portion 41 of the movable portion 15 by fastening bands 50. The other end of the long object K is fastened to the projections 45 of the support portion 41 of the fixed portion 13 by fastening bands 50.

The operation of the long object guide device 11 when used will now be described.

In the long object guide device 11, the fixed portion 13 is fixed to the mount surface 12. Thus, when the movable portion 15 is connected to a moving body (not shown) and reciprocates with the moving body in the reciprocal direction X, the two sheets 16 reciprocate in the reciprocal direction X so that the curved parts 16a shift following the moving body. At this time, the guide member 14 receives pushing force from the curved parts 16a of the two sheets 16 with the outer arcuate grooves 24 and the inner arcuate grooves 25 and thus reciprocates in the reciprocal direction X.

In this case, the long object guide device 11 reciprocates between the foremost position and the rearmost position. The foremost position corresponds to the position shown in FIG. 2 in which the movable portion 15 is arranged at the front end of the guide member 14, and the fixed portion 13 is arranged at the rear end of the guide member 14. The rearmost position corresponds to the position shown in FIG. 6 in which the movable portion 15 is arranged at the rear end of the guide member 14, and the fixed portion 13 is arranged at the front end of the guide member 14. More specifically, the long object guide device 11 repeatedly performs movement from the foremost position to the rearmost position and movement from the rearmost position to the foremost position in accordance with reciprocal movement of the moving body (not shown).

The long object K accommodated in the accommodation chamber S is protected and guided by the long object guide device 11 in accordance with the reciprocal movement of the moving body (not shown). Additionally, when the long object guide device 11 reciprocates, that is, when the movable portion 15 and the guide member 14 reciprocate in the reciprocal direction X, the rollers 47 of the movable portion 15 roll (rotate) in contact with the first contact surfaces 33 of the upper guide grooves 29, and the rollers 47 of the fixed portion 13 rotate in contact with the second contact surfaces 34 of the lower guide grooves 30.

Figure 6:
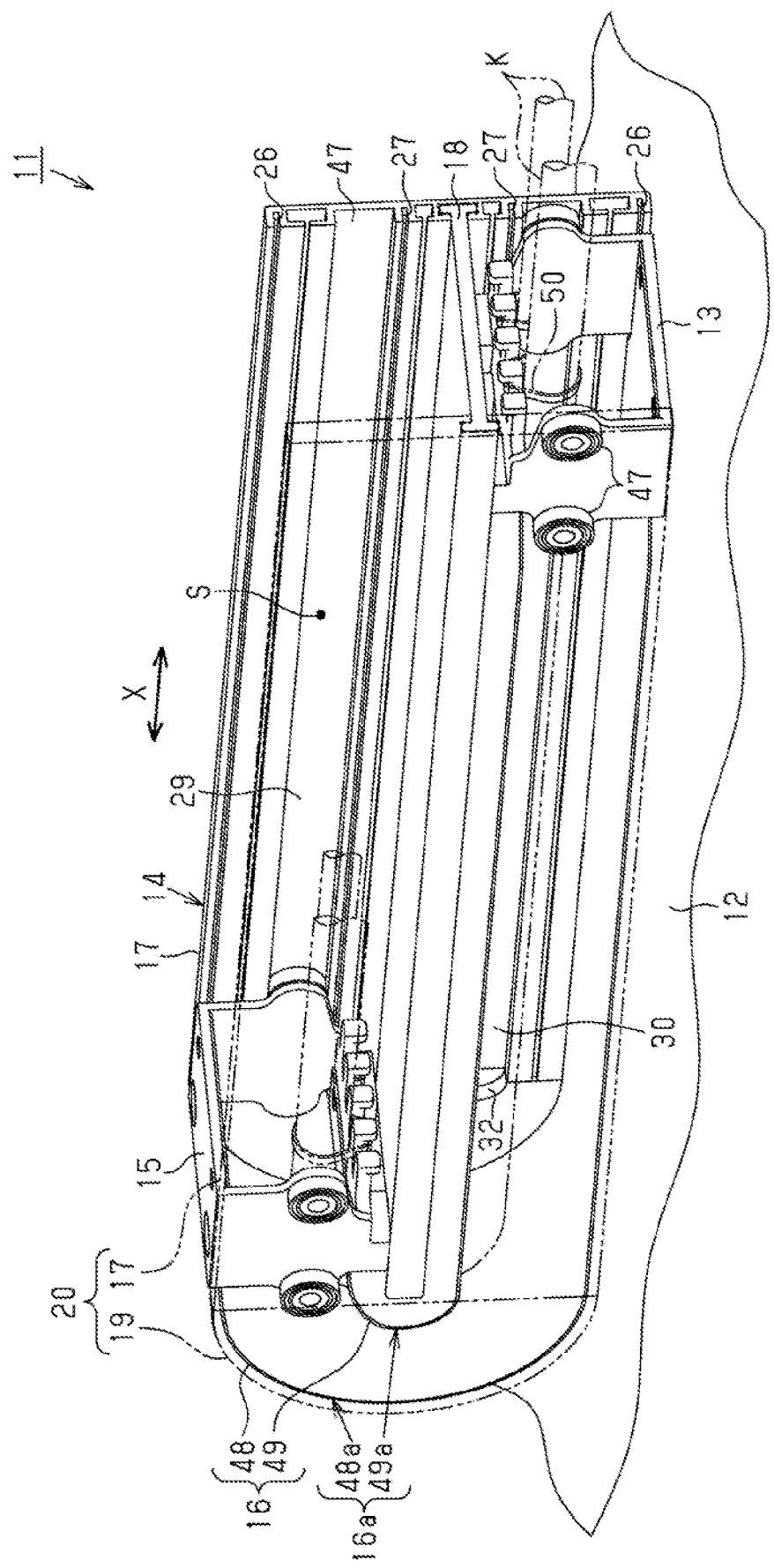
FIG. 6 is a perspective view of the long object guide device arranged in a rearmost position.

As shown in FIGS. 2 and 6, when the long object guide device 11 moves from the foremost position to the rearmost position, rearward movement of the movable portion 15 causes the curved part 48a of the outer sheet 48 and the curved part 49a of the inner sheet 49, which are respectively located in the outer arcuate grooves 24 and the inner arcuate grooves 25, to push the outer circumferential surface in the outer arcuate grooves 24 and the outer circumferential surface in the inner arcuate grooves 25 rearward.

The pushing force of the outer sheet 48 and the inner sheet 49 moves the guide member 14 rearward. More specifically, the guide member 14 moves rearward in accordance with the rearward movement of the outer sheet 48 and the inner sheet 49. At this time, the rear rollers 47 of the movable portion 15 are in contact with the upper contact surfaces 31 of the upper guide grooves 29.

When the long object guide device 11 moves from the rearmost position to the foremost position, forward movement of the movable portion 15 causes the curved part 48a of the outer sheet 48 and the curved part 49a of the inner sheet 49, which are respectively located in the outer arcuate grooves 24 and the inner arcuate grooves 25, to push the inner circumferential surface in the outer arcuate grooves 24 and the inner circumferential surface in the inner arcuate grooves 25 forward.

The pushing force of the outer sheet 48 and the inner sheet 49 moves the guide member 14 forward. More specifically, the guide member 14 moves forward in accordance with the forward movement of the outer sheet 48 and the inner sheet 49. At this time, the lower contact surfaces 32 of the lower guide grooves 30 of the guide member 14 are in contact with the rear rollers 47 of the fixed portion 13.

As described above, the guide member 14 reciprocates in the reciprocal direction X while guiding the movable portion 15, the outer sheet 48, and the inner sheet 49 so that in accordance with reciprocal movement of the movable portion 15, the outer sheet 48 and the inner sheet 49 reciprocate in the reciprocal direction X while respectively shifting the curved part 48a and the curved part 49a. In this case, the movable portion 15 is guided by the upper guide grooves 29, the outer sheet 48 is guided by the outer guide grooves 26, and the inner sheet 49 is guided by the inner guide grooves 27. The guide member 14 moves in coordination with the outer sheet 48 and the inner sheet 49.

The embodiment described above has the advantages described below.

(1) In the long object guide device 11, the movable portion 15 and the two sheets 16 (connecting portions) are supported by the guide member 14. Thus, even when the two sheets 16 wear due to the use of the long object guide device 11, the linear parts of the two sheets 16 located closer to the movable portion 15 than the curved parts 16a subtly sag. In other words, the wear of the two sheets 16 is not directly linked with the life of the long object guide device 11. The life of the long object guide device 11 prolongs as compared to a typical long object guide device having links such as that described in patent document 1.

(2) In the long object guide device 11, the accommodation chamber S capable of accommodating the long object K is defined between the two sheets 16, which are configured to be connecting portions. Thus, while the two sheets 16 define the accommodation chamber S, the movable portion 15 and the fixed portion 13 are connected in a well-balanced manner.

(3) In the long object guide device 11, the guide member 14 has the first contact surfaces 33 and the second contact surfaces 34. When the movable portion 15 and the guide member 14 reciprocate in the reciprocal direction X, the rollers 47 of the movable portion 15 rotate in contact with the first contact surfaces 33. When the movable portion 15 and the guide member 14 reciprocate in the reciprocal direction X, the rollers 47 of the fixed portion 13 rotate in contact with the second contact surfaces 34. Thus, the movable portion 15 and the guide member 14 smoothly reciprocate in the reciprocal direction X.

(4) In the long object guide device 11, the fixed portion 13 and the movable portion 15 each include the projections 45 capable of fixing the long object K accommodated in the accommodation chamber S. Thus, when the long object K is fastened to the projections 45 with the fastening bands 50, the long object K is stably accommodated in the accommodation chamber S.

(5) In the long object guide device 11, the movable portion 15 and the two sheets 16 (connecting portions) are supported by the guide member 14. Thus, the two sheets 16 (connecting portions) subtly sag. This extends the stroke of the guide member 14 and the movable portion 15.

(6) In the long object guide device 11, the movable portion 15 and the two sheets 16 (connecting portions) are supported by the guide member 14. Thus, the two sheets 16 do not bulge outward during reciprocal movement. Additionally, rails for moving the guide member 14 are not needed. This configuration saves space.

(7) In the long object guide device 11, the two sheets 16 (connecting portions) bend when used. Thus, noise is reduced as compared to a typical long object guide device having links such as that described in patent document 1. More specifically, a typical long object guide device having links such as that described in patent document 1 includes stoppers restricting a bending angle of the links, and the stoppers interfere with each other generating noise. In the long object guide device 11 of the present embodiment, such an interfering noise will not be generated.

(8) In the long object guide device 11, the two sheets 16 (connecting portions) bend when used. Thus, production of abrasion powder is limited as compared to a typical long object guide device having links such as that described in patent document 1. More specifically, in a typical long object guide device having links such as that described in patent document 1, sliding of the links on each other produces abrasion powder. However, the long object guide device 11 of the present embodiment includes no links. Thus, abrasion powder caused by sliding of links on each other will not be produced. This limits dust production.

MODIFIED EXAMPLES

The above-described embodiment may be modified as follows.

Figure 7:
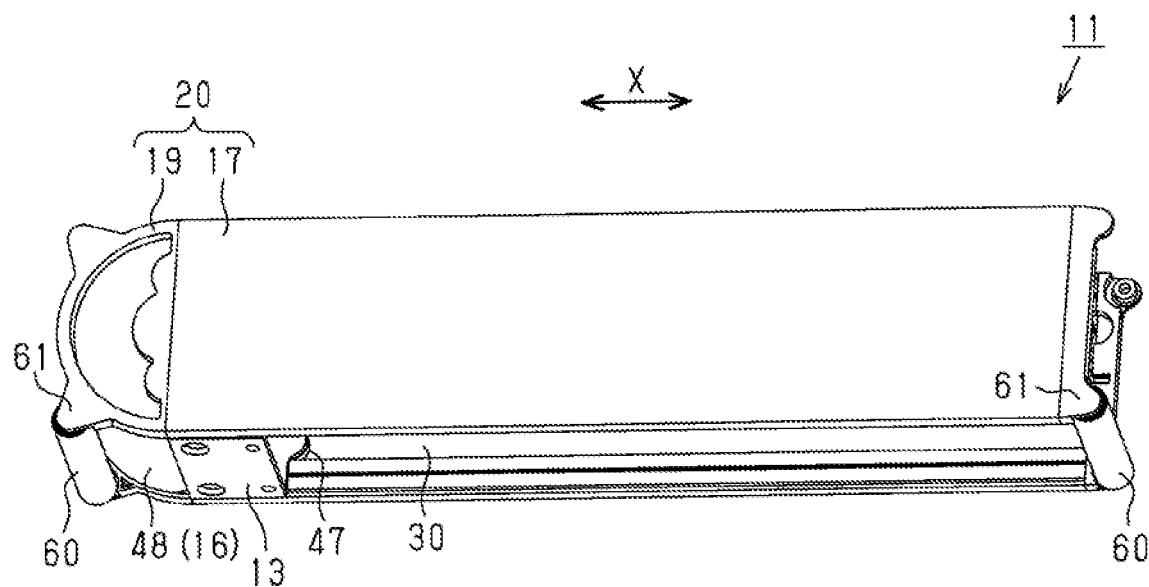
FIG. 7 is a perspective view showing a modified example of a guide device for a long object.
Figure 8:
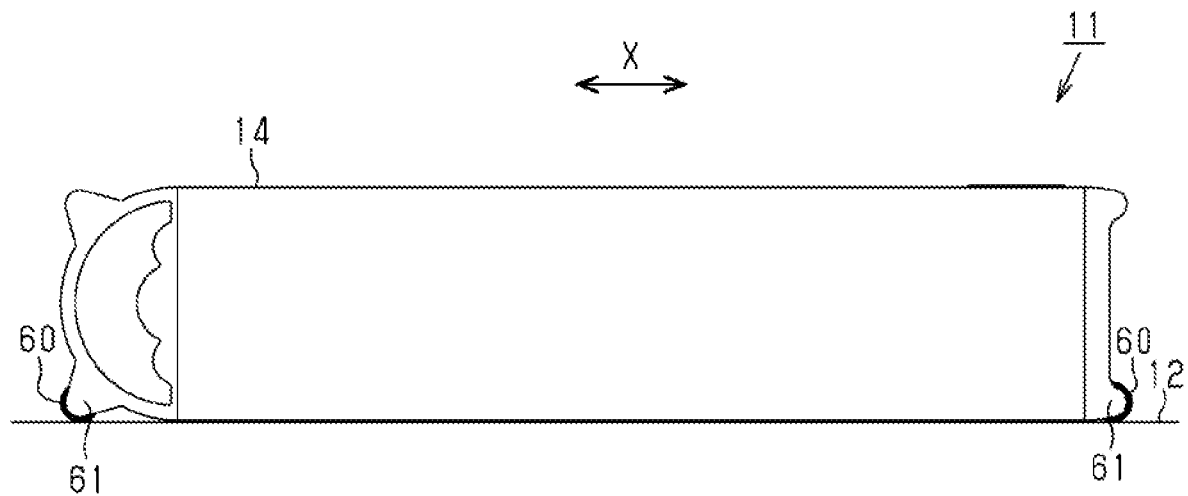
FIG. 8 is a side view of the long object guide device shown in FIG. 7.

As shown in FIGS. 7 and 8, in the long object guide device 11, the guide member 14 may include travel rollers 60. The travel rollers 60 act as rotary members configured to rotate in contact with the mount surface 12, that is, a movement surface, along which the guide member 14 reciprocates, when the guide member 14 reciprocates in the reciprocal direction X. More specifically, opposite ends of the guide member 14 in the reciprocal direction X may include roller supports 61 capable of rotationally supporting the travel rollers 60 so that the roller supports 61 support the travel rollers 60. With such a configuration, when the guide member 14 reciprocates in the reciprocal direction X, the travel rollers 60 roll on the mount surface 12. This allows the guide member 14 to smoothly reciprocate in the reciprocal direction X. Instead of the travel rollers 60, spherical bodies or rolling elements may be used as the rotary members.

The two sheets 16 may be flexible printed circuits (FPC). With such a configuration, the number of long objects K accommodated in the accommodation chamber S can be reduced.

The rollers 47 of the movable portion 15 and the fixed portion 13 may be changed to sliding members that do not rotate but slide in the upper guide grooves 29 and the lower guide grooves 30.

The number of rollers 47 of the movable portion 15 may be changed. The number of rollers 47 of the fixed portion 13 may be changed.

The two sheets 16 may be ladder-shaped having openings or be formed by mesh.

The connecting portions are not limited to the sheets 16 and may include a rod-shaped member or a thick member as long as the member is flexible.

The fixed portion 13 and the movable portion 15 do not necessarily have to include the projections 45.

The fixed portion 13 and the movable portion 15 do not necessarily have to have the same structure.

The accommodation chamber S does not necessarily have to be defined between the two sheets 16, which are configured to be the connecting portions. More specifically, one of the two sheets 16 (outer sheet 48 and inner sheet 49) may be omitted.

The mount surface 12 does not necessarily have to be a level surface. The mount surface 12 may be defined by an inclined surface that is inclined from the level surface.

DESCRIPTION OF REFERENCE CHARACTERS 11) guide device for long object; 12) mount surface configured to be movement surface; 13) fixed portion; 14) guide member; 15) movable portion; 16) sheet as connecting portion; 16a, 48a, 49a) curved part; 33) first contact surface; 34) second contact surface; 45) projection as long object fixing portion; 47) roller as first rotary body and second rotary body; 60) travel roller as rotary member; K) long object; S) accommodation chamber; X) reciprocal direction

The invention claimed is:

1. A guide device for a long object, the guide device comprising:
   a movable portion reciprocally movable in a reciprocal direction;
   a fixed portion fixed to be immovable in the reciprocal direction;
   a flexible connecting portion connecting the movable portion and the fixed portion when the connecting portion includes a curved part at an intermediate position in a longitudinal direction; and
   a guide member defining an accommodation chamber together with the connecting portion, the accommodation chamber being capable of accommodating the long object, wherein the guide member reciprocates in the reciprocal direction while guiding the movable portion and the connecting portion so that the connecting portion reciprocates in the reciprocal direction as the curved part is shifted in accordance with reciprocal movement of the movable portion.

2. The guide device according to claim 1, wherein
   the connecting portion includes two sheets opposed to each other, and
   the accommodation chamber is defined between the two sheets.

3. The guide device according to claim 1, wherein
   the movable portion includes a first rotary body capable of rotating,
   the fixed portion includes a second rotary body capable of rotating,
   the guide member includes a first contact surface and a second contact surface,
   when the movable portion and the guide portion reciprocate in the reciprocal direction, the first rotary body rotates in contact with the first contact surface, and
   when the movable portion and the guide portion reciprocate in the reciprocal direction, the second rotary body rotates in contact with the second contact surface.

4. The guide device according to claim 1, wherein the fixed portion and the movable portion each include a long object fastener capable of fastening the long object accommodated in the accommodation chamber.

5. The guide device according to claim 1, wherein the guide member includes a rotary member that rotates in contact with a movement surface, along which the guide member reciprocates, when the guide member reciprocates in the reciprocal direction.

* * * * *